US012802164B2

(12) United States Patent
Liu et al.

(10) Patent No.: US 12,802,164 B2
(45) Date of Patent: Nov. 17, 2026

(54) METHOD, DEVICE, AND COMPUTER PROGRAM PRODUCT FOR GENERATING SUPER-RESOLUTION IMAGE MODEL UTILIZING LOSS BASED ON DIFFERENCES BETWEEN FREQUENCY-DOMAIN REPRESENTATIONS

(71) Applicant: Dell Products L.P., Round Rock, TX (US)

(72) Inventors: Zhisong Liu, Shenzhen (CN); Zijia Wang, Weifang (CN); Zhen Jia, Shanghai (CN)

(73) Assignee: Dell Products L.P., Round Rock, TX (US)

(*) Notice: Subject to any disclaimer, the term of this patent is extended or adjusted under 35 U.S.C. 154(b) by 377 days.

(21) Appl. No.: 18/432,344

(22) Filed: Feb. 5, 2024

(65) Prior Publication Data

US 2025/0232402 A1 Jul. 17, 2025

(30) Foreign Application Priority Data

Jan. 12, 2024 (CN) ......................... 202410055130.9

(51) Int. Cl.
*G06T 3/4053* (2024.01)
*G06T 3/4046* (2024.01)

(52) U.S. Cl.
CPC .......... *G06T 3/4053* (2013.01); *G06T 3/4046* (2013.01)

(58) Field of Classification Search
None
See application file for complete search history.

(56) References Cited

U.S. PATENT DOCUMENTS

2008/0175519 A1* 7/2008 Nagumo ............... G06T 3/4076 382/299
2023/0298135 A1* 9/2023 Cao ....................... G06T 3/4053 382/299

(Continued)

OTHER PUBLICATIONS

C. Dong et al., "Image Super-Resolution Using Deep Convolutional Networks," IEEE Transactions on Pattern Analysis and Machine Intelligence, arXiv:1501.00092v3, Jul. 31, 2015, 14 pages.

(Continued)

*Primary Examiner* — Benny Q Tieu
*Assistant Examiner* — Pawan Dhingra
(74) *Attorney, Agent, or Firm* — Ryan, Mason & Lewis, LLP

(57) ABSTRACT

Embodiments of the present disclosure provide a method, a device, and a computer program product for generating a super-resolution image model. The method includes acquiring a first image with a first resolution and a second image with a second resolution, the first image corresponding to the second image; generating a first super-resolution image with a first super resolution and a second super-resolution image with a second super resolution according to an initial super-resolution image model based on the first image; transforming the first super-resolution image into a first frequency-domain representation; transforming the second super-resolution image into a second frequency-domain representation; and generating a trained super-resolution image model based on a loss between the first frequency-domain representation and the second frequency-domain representation and a reference frequency-domain representation of the second image.

20 Claims, 8 Drawing Sheets

(56) References Cited

U.S. PATENT DOCUMENTS

| | | | | |
|---|---|---|---|---|
| 2024/0153045 | A1* | 5/2024 | Kim | G06T 5/73 |
| 2024/0196160 | A1* | 6/2024 | Lee | H04S 7/307 |
| 2026/0024162 | A1* | 1/2026 | Li | G01N 21/6458 |

OTHER PUBLICATIONS

J. Kim et al., "Accurate Image Super-Resolution Using Very Deep Convolutional Networks," IEEE Conference on Computer Vision and Pattern Recognition (CVPR), arXiv:1511.04587v2, Nov. 11, 2016, 9 pages.

W.-S. Lai et al., "Deep Laplacian Pyramid Networks for Fast and Accurate Super-Resolution," IEEE Conference on Computer Vision and Pattern Recognition (CVPR), arXiv:1704.03915v2, Oct. 9, 2017, 9 pages.

C. Ledig et al., "Photo-Realistic Single Image Super-Resolution Using a Generative Adversarial Network," IEEE Conference on Computer Vision and Pattern Recognition (CVPR), arXiv:1609.04802v5, May 25, 2017, 19 pages.

B. Lim et al., "Enhanced Deep Residual Networks for Single Image Super-Resolution," IEEE Conference on Computer Vision and Pattern Recognition (CVPR), arXiv:1707.02921v1, Jul. 10, 2017, 9 pages.

Y. Zhang et al., "Image Super-Resolution Using Very Deep Residual Channel Attention Networks," European Conference on Computer Vision, arXiv:1807.02758v2, Jul. 12, 2018, 16 pages.

Y. Zhang et al., "Residual Dense Network for Image Super-Resolution," IEEE/CVF Conference on Computer Vision and Pattern Recognition, arXiv:1802.08797v2, Mar. 27, 2018, 10 pages.

M. Haris et al., "Deep Back-Projection Networks for Single Image Super-resolution," IEEE Transactions on Pattern Analysis and Machine Intelligence, arXiv:1904.05677v2, Jun. 13, 2020, 14 pages.

Z.-S. Liu et al., "Hierarchical Back Projection Network for Image Super-Resolution," IEEE/CVF Conference on Computer Vision and Pattern Recognition, arXiv:1906.06874v2, Jun. 20, 2019, 10 pages.

Z.-S. Liu et al., "Image Super-Resolution via Attention based Back Projection Networks," IEEE/CVF Conference on Computer Vision and Pattern Recognition, arXiv:1910.04476v, Oct. 10, 2019, 9 pages.

T. Dai et al., "Second-order Attention Network for Single Image Super-Resolution," Proceedings of the IEEE Conference on Computer Vision and Pattern Recognition, Jun. 1, 2019, 10 pages.

B. Niu et al., "Single Image Super-Resolution via a Holistic Attention Network," European Conference on Computer Vision, arXiv:2008.08767v1, Aug. 20, 2020, 16 pages.

I. J. Goodfellow et al., "Generative Adversarial Nets," Advances in Neural Information Processing Systems, arXiv:1406.2661v1, Jun. 10, 2014, 9 pages.

Z. Liu et al., "Photo-Realistic Image Super-Resolution via Variational Autoencoders," IEEE Transactions on Circuits and Systems for Video Technology, vol. 31, No. 4, Apr. 2021, 15 pages.

Z.-S. Liu et al., "Reference Based Face Super-Resolution," IEEE Access, vol. 7, Sep. 23, 2019, pp. 129112-129126.

J. Engel et al., "Latent Constraints: Learning to Generate Conditionally from Unconditional Generative Models," arXiv:1711.05772v2, Dec. 21, 2017, 22 pages.

Z.-S. Liu et al., "Unsupervised Real Image Super-Resolution via Generative Variational AutoEncoder," IEEE International Conference on Computer Vision and Pattern Recognition Workshop, arXiv:2004.12811v1, Apr. 27, 2020, 10 pages.

D. B. Lindell et al., "BACON: Band-Limited Coordinate Networks for Multiscale Scene Representation," The IEEE / CVF Computer Vision and Pattern Recognition Conference, Jun. 2022, 42 pages.

Y. Song et al., "TVSum: Summarizing Web Videos Using Titles," IEEE Conference on Computer Vision and Pattern Recognition (CVPR), Jun. 2015, pp. 5179-5187.

H. Jiang et al., "Super SloMo: High Quality Estimation of Multiple Intermediate Frames for Video Interpolation," arXiv:1712.00080v2, Jul. 13, 2018, 12 pages.

* cited by examiner

METHOD, DEVICE, AND COMPUTER PROGRAM PRODUCT FOR GENERATING SUPER-RESOLUTION IMAGE MODEL UTILIZING LOSS BASED ON DIFFERENCES BETWEEN FREQUENCY-DOMAIN REPRESENTATIONS

RELATED APPLICATION

The present application claims priority to Chinese Patent Application No. 202410055130.9, filed Jan. 12, 2024, and entitled "Method, Device, and Computer Program Product for Generating Super-Resolution Image Model," which is incorporated by reference herein in its entirety.

FIELD

Embodiments of the present disclosure relate to the field of computers, and more particularly, to a method, an electronic device, and a computer program product for generating a super-resolution image model.

BACKGROUND

Image/video super-resolution is a basic signal processing technology in computer vision. In particular, image/video super-resolution is the foundation for digitalization and communication. The goal of this technology is to compress rich spatial/temporal information into a denser space without losing the original quality. In view of the fact that human beings are now living in the era of big data, the amount of data is growing exponentially, especially when more high-definition devices are available. On the other hand, it is expensive to transmit high-definition images/videos with megapixels over the Internet. Using super resolution only at the edge can significantly reduce the burden of data transmission and compression/decompression.

SUMMARY

Embodiments of the present disclosure provide a solution for generating or training a super-resolution image model.

In a first aspect of the present disclosure, a method for generating a super-resolution image model is provided. The method includes acquiring a first image with a first resolution and a second image with a second resolution. Here, the first image corresponds to the second image. The method further includes generating a first super-resolution image with a first super resolution and a second super-resolution image with a second super resolution based on the first image according to an initial super-resolution image model. The method further includes transforming the first super-resolution image into a first frequency-domain representation. The method further includes transforming the second super-resolution image into a second frequency-domain representation. The method further includes generating a trained super-resolution image model based on the first frequency-domain representation, the second frequency-domain representation, and a reference frequency-domain representation of the second image.

In a second aspect of the present disclosure, an electronic device is provided. The electronic device includes at least one processor, and a memory coupled to the at least one processor, the memory having instructions stored therein that, when executed by the at least one processor, cause the electronic device to perform actions. The actions include acquiring a first image with a first resolution and a second image with a second resolution. Here, the first image corresponds to the second image. The actions further include generating a first super-resolution image with a first super resolution and a second super-resolution image with a second super resolution based on the first image according to the initial super-resolution image model. The actions further include transforming the first super-resolution image into a first frequency-domain representation. The actions further include transforming the second super-resolution image into a second frequency-domain representation. The actions further include generating a trained super-resolution image model based on the first frequency-domain representation, the second frequency-domain representation, and a reference frequency-domain representation of the second image.

In a third aspect of the present disclosure, a computer program product is provided. The computer program product is tangibly stored on a non-transitory computer-readable medium and includes machine-executable instructions that, when executed by a machine, cause the machine to perform the method according to the first aspect.

This Summary is provided to introduce a selection of concepts in a simplified form, which are further described in the Detailed Description below. The Summary is not intended to identify key features or major features of the present disclosure, nor is it intended to limit the scope of the present disclosure.

BRIEF DESCRIPTION OF THE DRAWINGS

The above and other objects, features, and advantages of the present disclosure will become more apparent from description of exemplary embodiments of the present disclosure provided in more detail herein with reference to the accompanying drawings. In exemplary embodiments of the present disclosure, the same reference numerals generally represent the same components. In the accompanying drawings.

DETAILED DESCRIPTION

Figure 1:
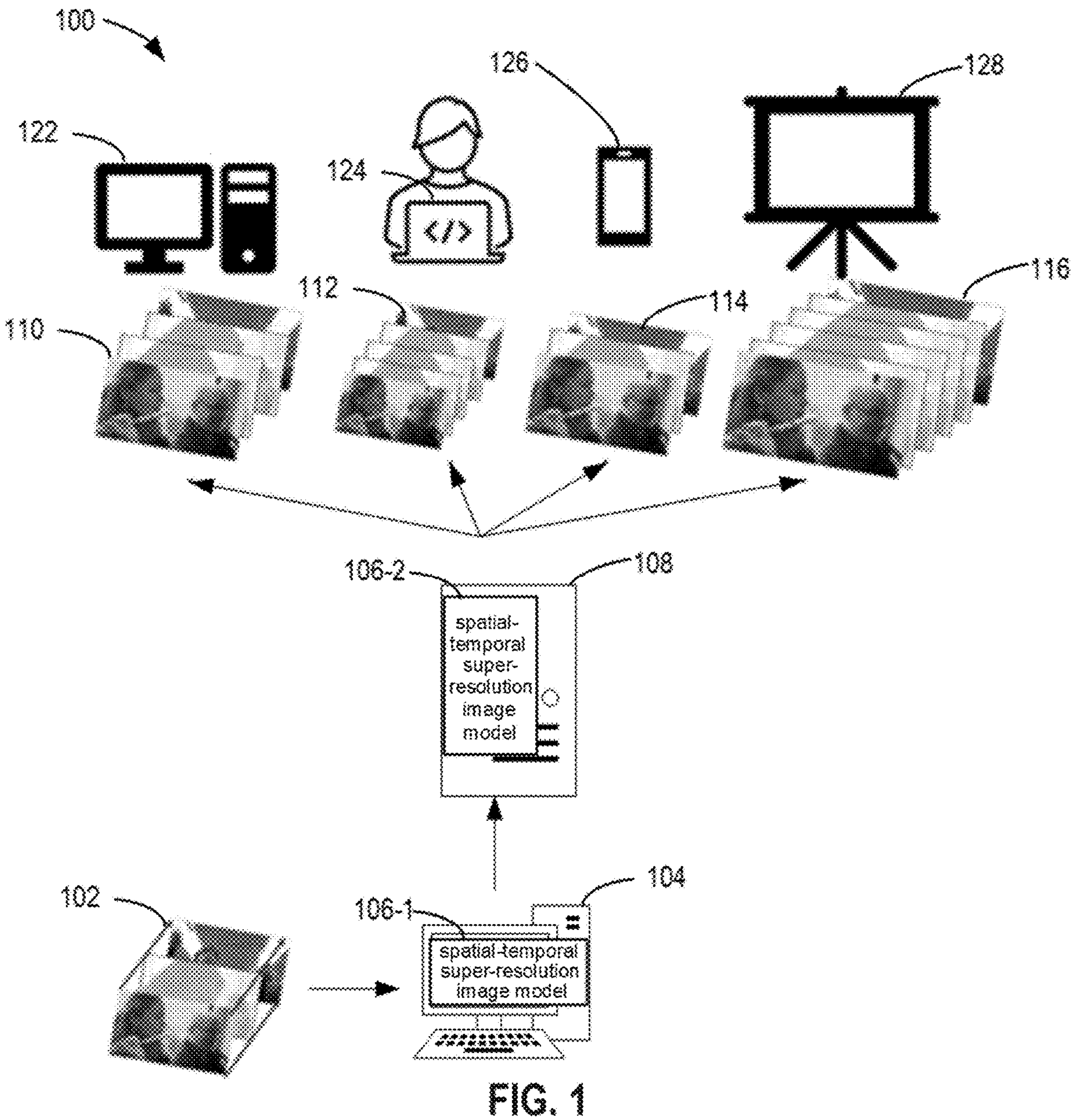
FIG. 1 shows a schematic diagram of an example environment in which embodiments of the present disclosure can be implemented.

Principles of the present disclosure will be described below with reference to several example embodiments shown in the drawings. Although illustrative embodiments of the present disclosure are shown in the drawings, it should be understood that these embodiments are described only to enable those skilled in the art to better understand and implement the present disclosure, and are not intended to limit the scope of the present disclosure in any way.

As used herein, the term "include" and its variants mean open inclusion, that is, "include but not limited to." Unless otherwise stated, the term "or" means "and/or." The term "based on" means "at least partially based on." The terms "an exemplary embodiment" and "an embodiment" mean "at least one exemplary embodiment." The term "another embodiment" means "at least one additional embodiment." The terms "first," "second," and the like may refer to different objects or the same object. Other explicit and implicit definitions may be included below.

In the related art, there are many machine learning solutions based on a neural network for image/video super resolution. Using these machine learning solutions, the details of an image can be reconstructed to a certain extent, so that the generated video can have sharp visual quality. In some solutions, high-frequency information of successive images or videos is used to improve prediction results. Among those, a model based on a band-limited network can project the coordinates into the high-frequency domain, and then reconstruct the image in consideration of the high-frequency information.

However, the ability of a deep neural network to learn high-frequency information is limited, so that the model based on high-frequency information cannot guarantee the contribution of high-frequency reconstruction to the final video, thus affecting the performance of the obtained high-resolution model based on a deep neural network.

In view of this, an embodiment of the present disclosure provides a solution to generate a high-resolution image model by using the frequency-domain loss to solve one or more of the above problems and other potential problems. In this solution, in the training process, the initial model generates multiple super-resolution images with different super resolutions based on a training image. Then, the generated super-resolution images are transformed into the frequency domain to obtain frequency-domain representations corresponding to the spatial representations of the multiple super-resolution images. At the same time, the image as a real value image corresponding to the training image is also transformed into a frequency-domain representation. Finally, the initial model is optimized or trained through the frequency-domain loss between the generated super-resolution image and the real value image, so as to obtain a trained super-resolution image model configured to generate images with different super resolutions based on the input image.

In an embodiment of the present disclosure, by minimizing the real image and supervising the optimization of the network by applying the frequency enhancement process, the high-frequency components of the reconstructed super-resolution image and the real value image are aligned, and the missing information is recovered, thereby improving the prediction effect and allowing the created super-resolution image to have a sharper visual effect.

FIG. 1 shows a schematic diagram of an example environment 100 in which embodiments of the present disclosure can be implemented. As shown in FIG. 1, the environment 100 includes a computing device 104 of a provider. A spatial-temporal super-resolution image model 106-1 according to an embodiment of the present disclosure is deployed on the computing device 104. The computing device 104 receives an original video 102 from the provider and compresses the original video 102 by using the spatial-temporal super-resolution image model 106-1 to obtain a compressed video with a reduced resolution or reduced frame rate. After obtaining the compressed video, the computing device 104 transmits it to the server 108. The server 108 stores the generated compressed video. A spatial-temporal super-resolution image model 106-2 is also deployed at the server 108. The spatial-temporal super-resolution image model 106-2 can be reconstructed based on the stored compressed video, so as to obtain a video with a high resolution for accessors to access.

On the accessor side, the environment 100 includes a desktop computer 122, a laptop computer 124, a smartphone 126, and a smart projection device 128, each illustratively an example of a terminal device, which may comprise or be otherwise associated with a computing device on the accessor side. It should be understood that a given computing device on the accessor side as shown in the figure is only an example, and such a computing device may include any computing device suitable for deploying the spatial-temporal super-resolution image model 106 according to an embodiment of the present disclosure. In some embodiments, the computing device on the accessor side can communicate with the server 108 and send an access request for stored data to the server 108. For example, the desktop computer 122, the laptop computer 124, the smartphone 126, and the smart projection device 128 may each send a request for the original video 102 to the server 108. In some embodiments, the request sent by the computing device on the accessor side may compute the device information of the device. For example, the device information may include the resolution and frame rate supported by the computing device. After the server 108 receives the request from the computing device on the accessor side, the server 108 can determine the specification of the video that should be generated by, for example, viewing the device information of the computing device that made the request. For example, the desktop computer 122 can support a first resolution and a first frame rate. The laptop computer 124 can support a second resolution and a second frame rate. The smartphone 126 can support a third resolution and a third frame rate. The smart projection device 128 can support a fourth resolution and a fourth frame rate.

In the embodiment shown in FIG. 1, the smart phone 126 has the smallest screen, and the smartphone 126 only supports the minimum frame rate due to technical limitations. In contrast, the smart projection device 128 has the largest screen and a higher refresh rate. Therefore, the third resolution and the third frame rate supported by the smartphone 126 are the lowest, while the fourth resolution and the fourth frame rate supported by the smart projection device 128 are the highest. In addition, the screen of the desktop computer 122 is larger than that of the laptop computer 124, but the screen quality of the desktop computer 122 is lower than that of the laptop computer 124. Therefore, the first resolution supported by the desktop computer 122 is higher than the second resolution supported by the laptop computer 124, while the first frame rate supported by the desktop computer 122 is lower than the second frame rate supported by the laptop computer 124. Based on this, the server 108 reconstructs the high-resolution video 110, the high-resolution video 112, the high-resolution video 114, and the high-resolution video 116 at the request from the desktop computer 122, the laptop computer 124, the smartphone 126, and the smart projection device 128, respectively, and sends the reconstructed videos to the corresponding accessors, respectively.

In the illustrated embodiment, the high-resolution video 114 received by the smart phone 126 has three frames, the high-resolution video 110 received by the desktop computer 122 has four frames, the high-resolution video 112 received by the laptop computer 124 has five frames, and the high-resolution video 116 received by the smart projection device 128 has six frames. In the process of generating the spatial-temporal super-resolution image model 106 according to embodiments of the present disclosure, the performance of the spatial-temporal super-resolution image model 106 is improved by considering the frequency-domain loss between the generated image and the real image, thus making the generated super-resolution image sharper.

Figure 2:
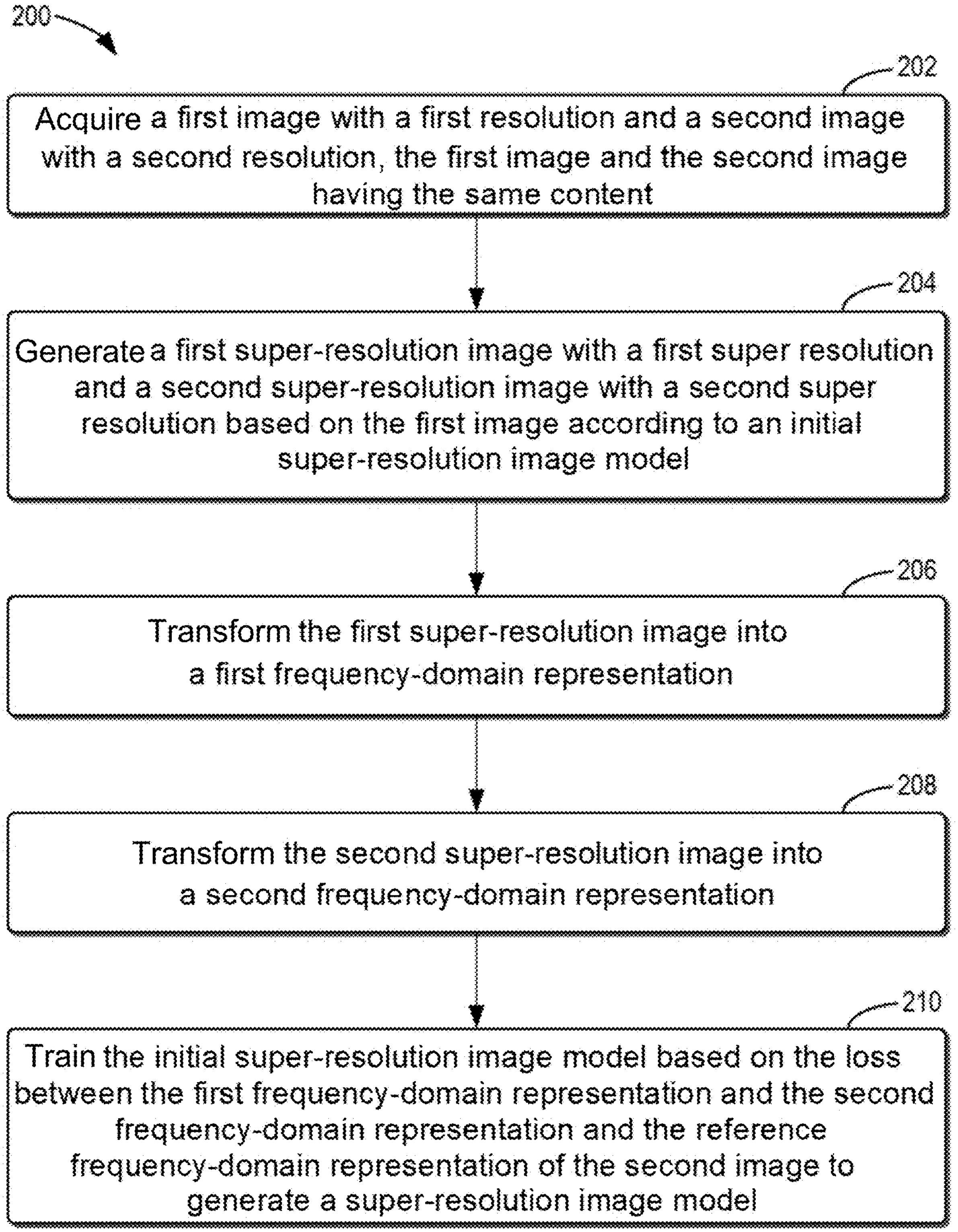
FIG. 2 shows a flowchart of an example method for generating a super-resolution image model according to an embodiment of the present disclosure.

FIG. 2 shows a flowchart of an example method 200 for generating a super-resolution image model according to an embodiment of the present disclosure. For the purpose of discussion, the example method 200 of FIG. 2 will be described below in connection with FIG. 1. For example, the method 200 may be implemented by the server 108 in FIG. 1. It should be understood that the method 200 may also be implemented by other computing devices in FIG. 1. The present disclosure is not intended to be limiting in this respect.

As shown in FIG. 2, at 202, the method 200 includes acquiring a first image with a first resolution and a second image with a second resolution. Here, the first image and the second image have the same content. For example, in the embodiment shown in FIG. 1, the server 108 can acquire a first image with a first resolution and a second image with a second resolution. In this embodiment, the first image may be a part of training data including a large number of images, and the second image may be a real image corresponding to the first image.

In some embodiments, in order to obtain the training data and the real value corresponding to it, the server 108 can first obtain a second image with a super resolution as the real value, also referred to herein as a real value image or simply a real image. After that, the server 108 can reduce the resolution of the second image to obtain the first image with a lower resolution as the training image.

At 204, the method 200 includes generating a first super-resolution image with a first super resolution and a second super-resolution image with a second super resolution based on the first image according to an initial super-resolution image model. For example, in the embodiment shown in FIG. 1, the server 108 can generate a first super-resolution image with a first super resolution and a second super-resolution image with a second super resolution based on the first image according to the initial super-resolution image model. Here, the initial super-resolution image model may include a super-resolution image model at any time before completion of the training. The super-resolution image model is configured to take an image as an input and output an image with the same content as but higher super resolution than the input image. In some embodiments, the number of generated super-resolution images may be preset, and the super-resolution image model may generate more than two super-resolution images.

At 206, the method 200 includes transforming the first super-resolution image into a first frequency-domain representation. For example, in the embodiment shown in FIG. 1, the server 108 can transform the first super-resolution image into a first frequency-domain representation. Meanwhile, at 208, the method 200 includes transforming the second super-resolution image into a second frequency-domain representation. For example, in the embodiment shown in FIG. 1, the server 108 may transform the second super-resolution image into a second frequency-domain representation. In order to perform the optimization based on frequency loss, the frequency-domain information of the image needs to be quantized first.

In some embodiments, the server 108 can extract a feature map of the generated super-resolution image to obtain a quantized representation of the super-resolution image. The feature map can be implemented by any suitable encoder, for example. After that, the server 108 can determine the feature vector of each pixel in the super-resolution image in the feature map. Thus, a set of feature vectors including the feature vector of each pixel in the super-resolution image can be obtained. Finally, the server 108 can perform a Fourier transform on the obtained set of feature vectors to obtain a set of sub-frequency-domain representations as the first frequency-domain representation.

In this embodiment, the frequency-domain representation can be obtained by discrete Fourier transform. For example, the frequency-domain representation can be expressed as:

$$F(u, v)\sum_{x=0}^{M-1}\sum_{y=0}^{N-1} f(x, y)\cdot e^{-i2\pi\left(\frac{ux}{M}\frac{vy}{N}\right)} \tag{1}$$

where the size of the image is M×N; (x, y) is the coordinate of a pixel in the image in the spatial domain; f(x, y) is the pixel value; (u, v) represents the coordinate of the frequency of a pixel on the spectrum; and F(u, v) represents a complex frequency-domain value.

At 210, the method 200 includes training the initial super-resolution image model based on the loss between the first frequency-domain representation and the second frequency-domain representation and the reference frequency-domain representation of the second image to generate a super-resolution image model. For example, in the embodiment shown in FIG. 1, the server 108 can train the initial super-resolution image model based on the loss between the first frequency-domain representation and the second frequency-domain representation and the reference frequency-domain representation of the second image to generate the super-resolution image model. In the process of training the machine learning model, it is necessary to optimize the parameters in the model by the minimized loss function. In this embodiment, the loss function can be constructed based on the frequency-domain distance between the generated first super-resolution image and second super-resolution image and the second image as a real value image. When the frequency-domain distance is reduced, it indicates that the generated super-resolution image is closer to the real image. For example, the frequency-domain distance can be expressed by the square root.

In the embodiment shown in FIG. 2, the loss function for training the model is constructed based on the frequency-domain loss between the generated image and the real image, which can reduce the frequency-domain information lost when the model uses the mechanism of limited frequency bandwidth, thus improving the performance of the spatial-temporal super-resolution image model and making the generated super-resolution image sharper. Next, the construction of the loss function will be introduced with reference to FIGS. 3 and 4.

Figure 3:
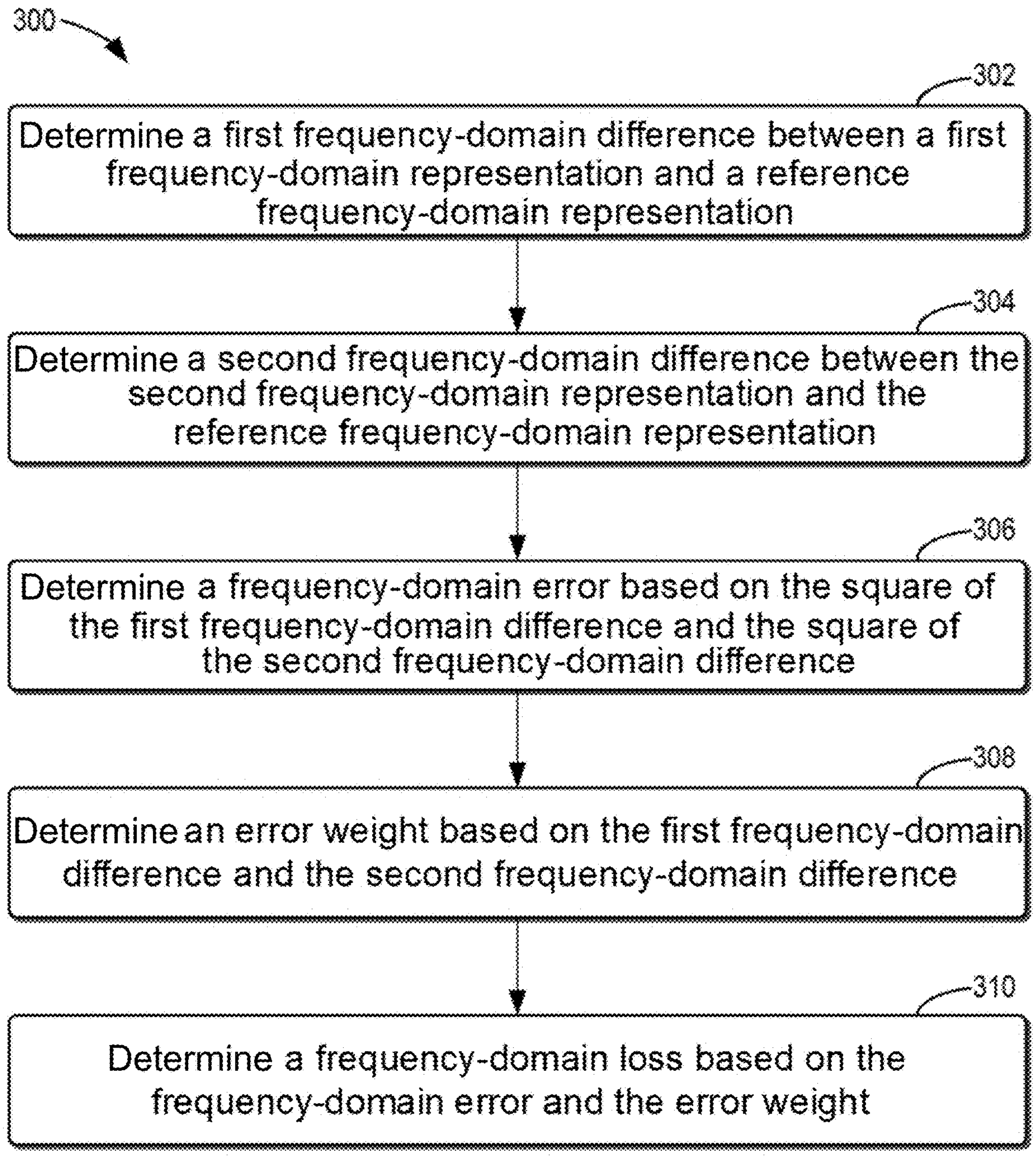
FIG. 3 shows a flowchart of an example method for determining frequency-domain loss according to an embodiment of the present disclosure.

FIG. 3 shows a flowchart of an example method 300 for determining a frequency-domain loss according to an embodiment of the present disclosure. For the purpose of discussion, the example method 300 of FIG. 3 will be described below in conjunction with FIG. 1. For example, the method 300 can be implemented by the server 108 in FIG. 1.

As shown in FIG. 3, at 302, the server 108 determines a first frequency-domain difference between a first frequency-domain representation and a reference frequency-domain representation. At 304, the server 108 determines a second frequency-domain difference between the second frequency-domain representation and the reference frequency-domain representation. In some embodiments, the first frequency-domain representation and the second frequency-domain representation are vectors, and the frequency-domain difference may be the distance between the vectors. Based on the frequency-domain representation in Equation (1), the frequency-domain difference can be expressed as:

$$F_X(u, v) - F_Y(u, v) \tag{2}$$

where $F_X(u, v)$ represents the frequency-domain representation of the generated image, and $F_Y(u, v)$ represents the reference frequency-domain representation.

At 306, the server 108 determines a frequency-domain error based on the square of the first frequency-domain difference and the square of the second frequency-domain difference. Here, for example, the frequency-domain error can be expressed as the square of the frequency-domain difference as follows:

$$J(u, v) = |F_X(u, v) - F_Y(u, v)|^2 \tag{3}$$

where J(u, v) represents an error function based on the frequency-domain difference.

At 308, the server 108 determines an error weight based on the first frequency-domain difference and the second frequency-domain difference. Here, the error weight can for example be expressed as:

$$w(u, v) = |F_r(u, v) - F_f(u, v)|^\alpha \tag{4}$$

where w(u, v) represents the error weight at (u, v), and $\alpha$ is a scaling factor that can be set flexibly. In some embodiments, $\alpha$ is set to 1.

At 310, the server 108 determines a frequency-domain loss based on the frequency-domain error and the error weight. In some embodiments, the frequency-domain loss, that is, the loss function of the frequency domain, may be an average weighted sum of the frequency domain errors based on the obtained error weights. The frequency loss can for example be expressed as:

$$FFL(X, Y) = \frac{1}{MNK}\sum_{x=0}^{K-1}\sum_{u=0}^{M-1}\sum_{v=0}^{N-1} w(u, v)J(u, v) \tag{5}$$

where FFL denotes focal frequency loss, and K represents the number of generated super-resolution images. In this embodiment, K is 2.

In the embodiment shown in FIG. 3, the loss function includes the frequency-domain distance between each generated super-resolution image and the real image. Therefore, the loss function takes into account the generated image at each resolution more comprehensively, so that the generated super-resolution image model has good performance for each resolution.

Figure 4:
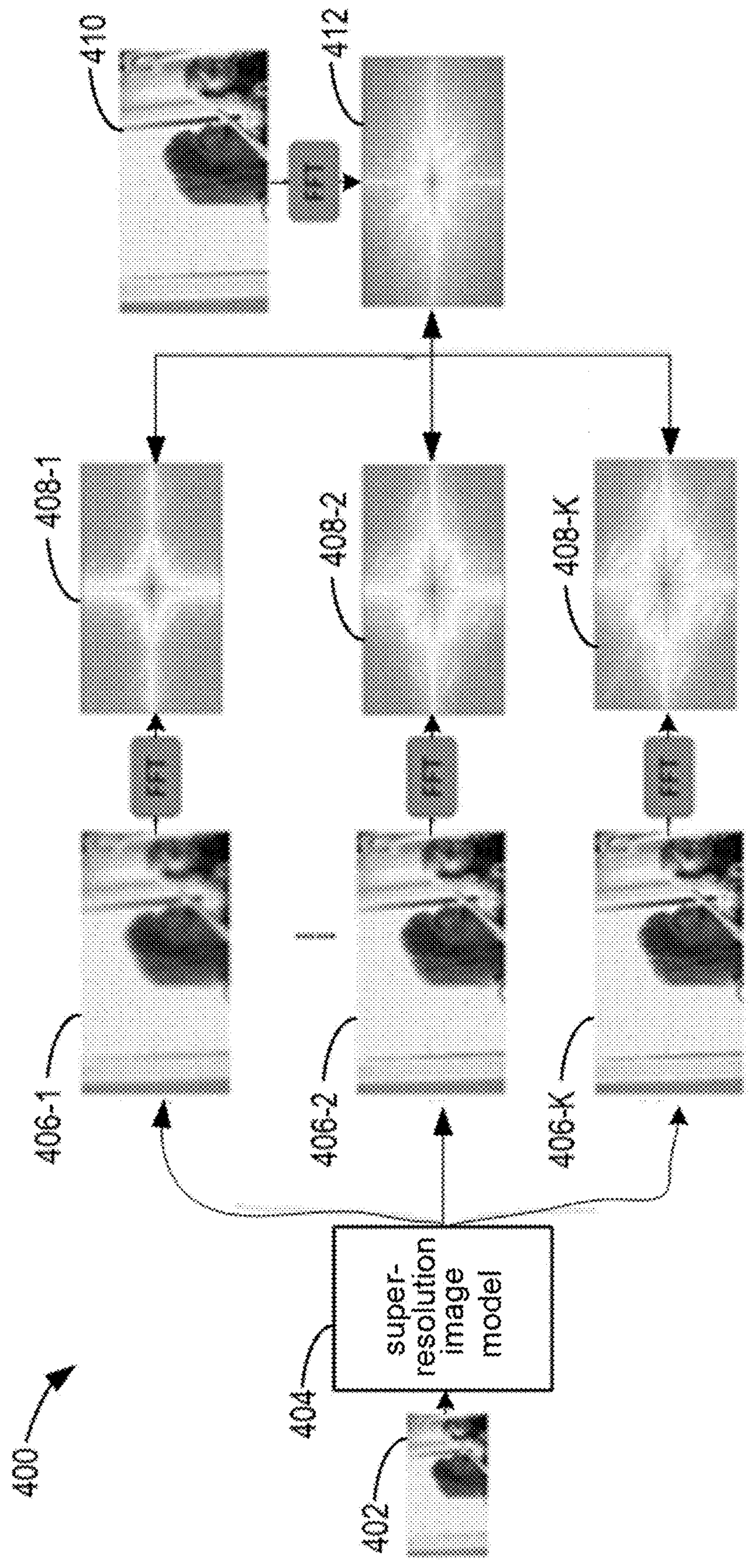
FIG. 4 shows a schematic diagram of an example process of determining a frequency-domain loss according to an embodiment of the present disclosure.

It should be understood that although in the embodiment shown in FIG. 3, the super-resolution image model generates two super-resolution images based on the training image, this is only exemplary. A more general solution is described below with reference to FIG. 4. FIG. 4 shows a schematic diagram of an example process 400 of determining a frequency-domain loss according to an embodiment of the present disclosure.

As shown in FIG. 4, the process 400 includes two stages. In the first stage, the super-resolution image model 404 (e.g., corresponding to the super-resolution image model in the embodiment shown in FIG. 3) takes the training image 402 as an input for processing. The super-resolution image model 404 generates a super-resolution image 406-1 with a first super resolution, a super-resolution image 406-2 with a second super resolution, and a super-resolution image 406-K with a K-th super resolution based on the presetting, for example. Here, K is an integer greater than or equal to 3. After the image is generated, the process proceeds to the evaluation stage where the generated image is transformed from spatial domain to a frequency domain representation utilizing a fast Fourier transform (FFT). As shown in the figure, the super-resolution image 406-1 is transformed into a frequency-domain representation 408-1; the super-resolution image 406-2 is transformed into a frequency-domain representation 408-2; and the super-resolution image 406-K is transformed into a frequency-domain representation 408-K. Meanwhile, a real image 410 as a real value is transformed into a reference frequency-domain representation 412 through a fast Fourier transform. Then, based on Equation (5), the frequency-domain loss is calculated, and the super-resolution image model 404 is optimized. In this embodiment, the resolution of the real image 410 may be greater than or equal to the maximum resolution from the first super resolution to the K-th super resolution.

Figure 5A:
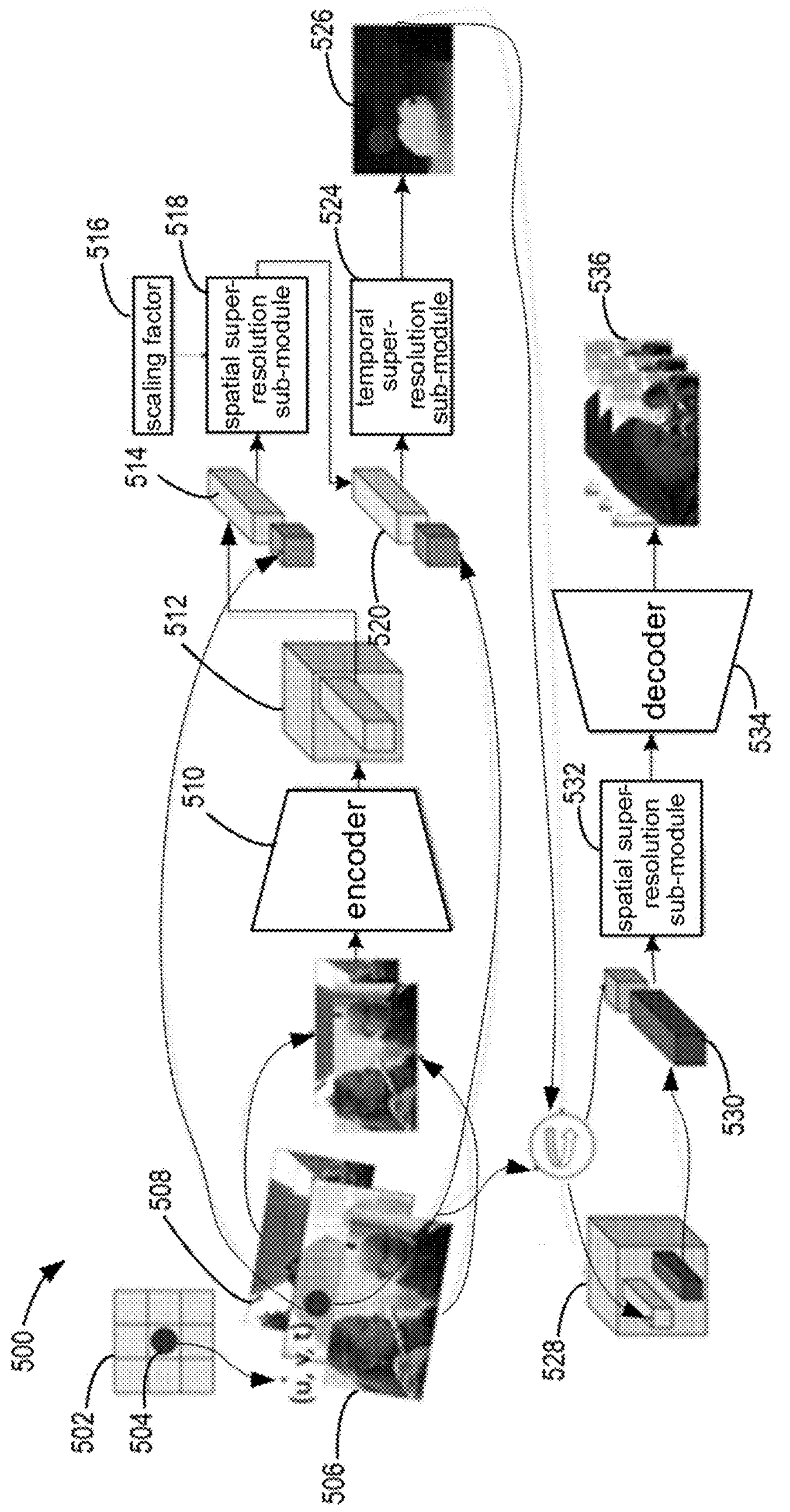
FIG. 5A shows a schematic diagram of an example process of generating a super-resolution image according to an embodiment of the present disclosure.

FIG. 5A shows a schematic diagram of an example process 500 of generating a super-resolution image according to an embodiment of the present disclosure. As shown in FIG. 5A, in the process 500, two successive images 506 and 508 are input. After that, the image 506 and the image 508 are input to the encoder 510 of the super-resolution image model. The encoder 510 processes the image 506 and the image 508 to obtain a spliced feature map 512, that is, the feature map obtained by splicing the feature map of the image 506 with the feature map of the image 508.

In the process of generating the super-resolution image, the super-resolution image model will predict the pixel value of the pixel indicated by each spatial-temporal coordinate in an input video. First, the spatial-temporal coordinate 504 is randomly selected from the query coordinate map 502. The spatial-temporal coordinate 504 corresponds to the spatial-temporal coordinate (u, v, t) in the set consisting of the image 506 and the image 508. After obtaining the spliced feature map 512, a feature vector 514 corresponding to the spatial-temporal coordinate (u, v, t) is selected. Then, the feature vector 514 along with the spatial coordinate (u, v) in the spatial-temporal coordinate (u, v, t) are input to the spatial super-resolution sub-module 518 in the spatial-temporal super-resolution model of the super-resolution image model. In addition, the scaling factor 516 is also input to the spatial super-resolution sub-module 518. The spatial super-resolution sub-module 518 reconstructs the feature vector 514 into a set of features 520 with the number and super resolution indicated by the scaling factor 516. The set of features 520 along with the temporal coordinate (t) in the spatial-temporal coordinate (u, v, t) are input to the temporal super-resolution sub-module 524 in the spatial-temporal super-resolution module of the super-resolution image model. The temporal super-resolution sub-module 524 determines the spatial-temporal representation in the optical flow 526 corresponding to the pixel indicated by the spatial-temporal coordinate (u, v, t). After that, the spatial-temporal representation is input to the decoding sub-module 528 of the spatial-temporal super-resolution module, and the decoding sub-module 528 selects the feature vector 530 corresponding to the spatial-temporal coordinate from the feature map obtained based on the spatial-temporal representation. After that, the feature vector 530 along with the spatial-temporal coordinate are input to the spatial super-resolution sub-module 532 of the spatial super-resolution module to obtain the recovered features. Finally, the obtained features are input to the decoder 534 to obtain the pixel values corresponding to the spatial-temporal coordinate (u, v, t) at all the resolutions indicated by the scaling factor. After traversing all the pixel coordinates, super-resolution images 536 with different resolutions are obtained.

Figure 5B:
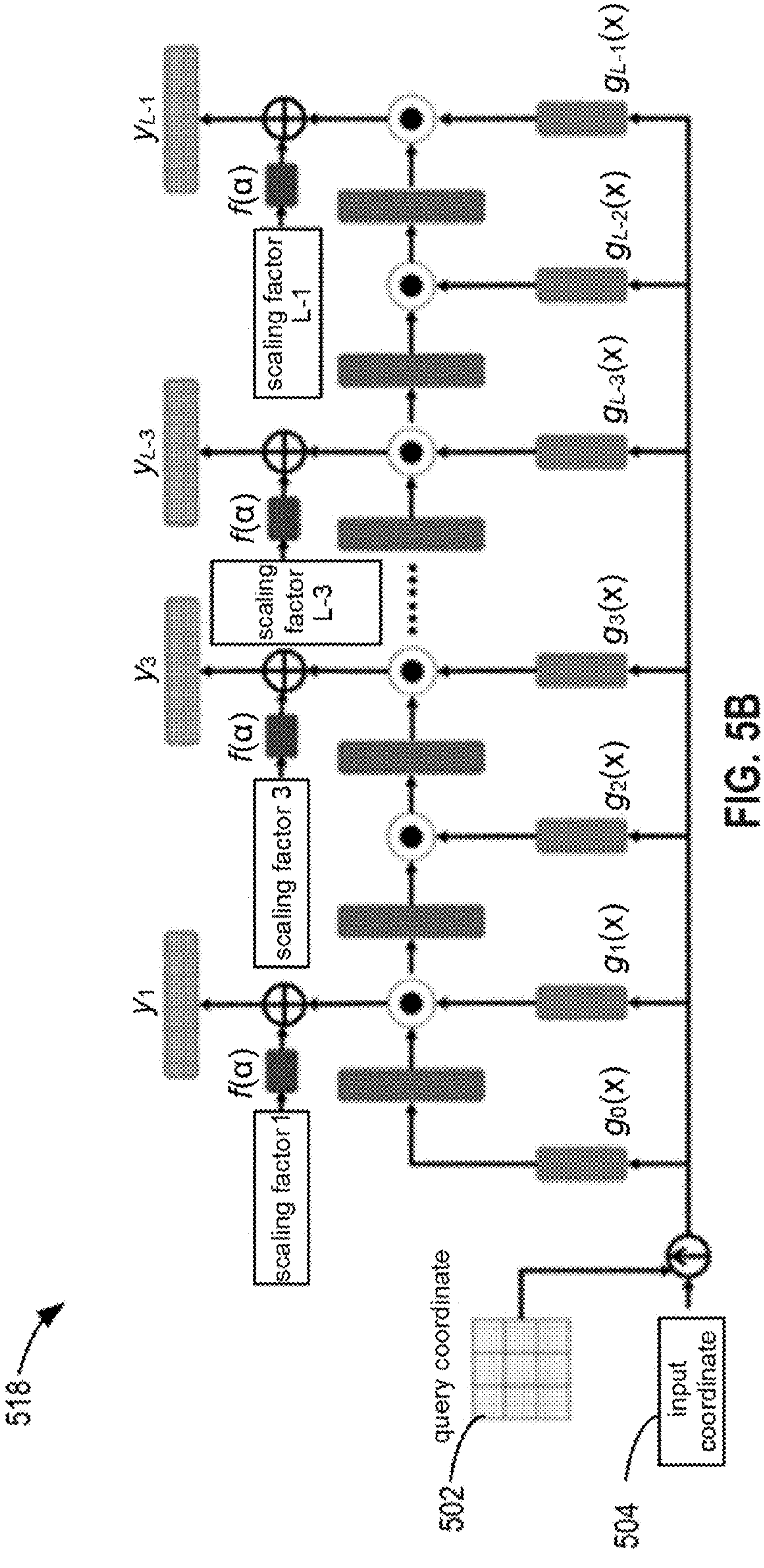
FIG. 5B shows a schematic diagram of an example architecture of a spatial super-resolution sub-module according to an embodiment of the present disclosure.

FIG. 5B shows a schematic diagram of an example architecture of a spatial super-resolution sub-module 518 according to an embodiment of the present disclosure. As shown in FIG. 5B, the spatial super-resolution sub-module 518 includes a sequence of Multi-Layer Perceptrons (MLPs) based on a band-limited network. The spatial-temporal coordinate 504 as the input coordinate and the query coordinate map 502 are input to the spatial super-resolution sub-module 518. The spatial-temporal coordinate 504 will pass through all the multi-layer perceptron layers and be computed along with the input scaling factor to generate the corresponding output feature. The output feature will be expressed as the sum of sinusoidal signals with different amplitudes, frequencies, and phases. The output features can be expressed as follows:

$$z_0 = g_0(x) \tag{6}$$

$$z_i = g_i(x) \circ (W_i z_{i-1} + b_i)$$

$$y_i = W_i^{out} z_i + b_i^{out},$$

$$g_i(x) = \sin(\omega_i x + \phi_i) \tag{7}$$

where $z_i$ is the intermediate activation, and $y_i$ is the output feature. In addition, $$\omega_i,\ W_i^{out},\ W_i,\ \phi_i \text{ and } b_i$$

are the module parameters.

After that, the frequencies or w; in the Equations (6) and (7) are set in a frequency band $[-B_i, B_i]$ to limit the output frequency. In this embodiment, the spatial super-resolution model used limits the specific frequency. However, as shown above, in the operation of the model, information of some frequencies may be lost, which leads to deterioration of the results output by the model. Therefore, the optimization method based on the frequency-domain loss is especially suitable for spatial super-resolution image model based on a band-limited network.

Figure 6:
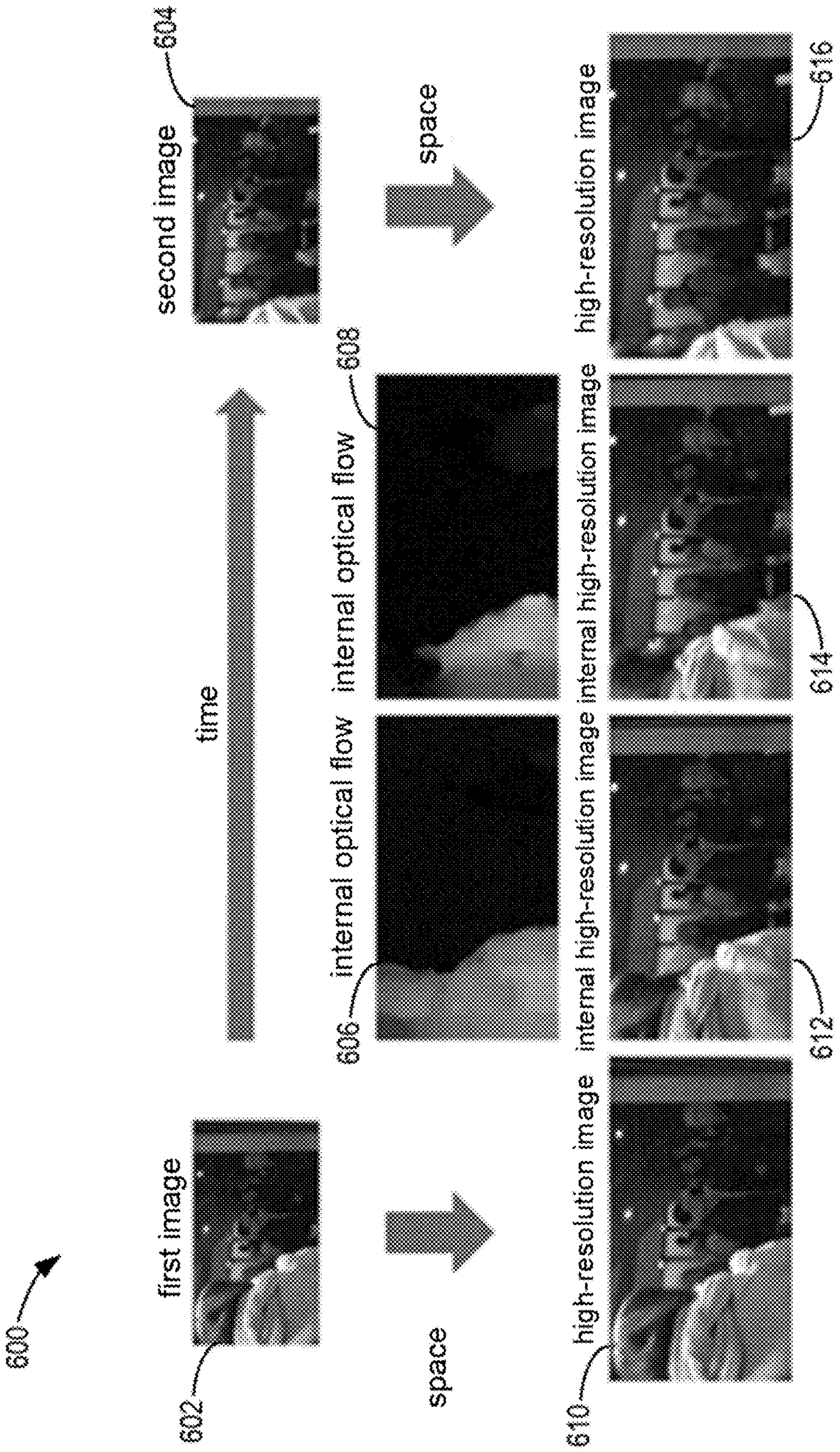
FIG. 6 shows a schematic diagram of an example process of generating high-resolution videos with different resolutions and frame rates according to an embodiment of the present disclosure.

FIG. 6 shows a schematic diagram of an example process 600 of generating high-resolution videos with different resolutions and frame rates according to an embodiment of the present disclosure. As shown in FIG. 6, in the process 600, the inputs are a first image 602 and a second image 604 adjacent to the first image 602 in the time domain. After using the spatial-temporal super-resolution image model according to an embodiment of the present disclosure, an internal optical flow 606 and an internal optical flow 608 between the time where the first image 602 is located and the time where the second image 604 is located are obtained. Based on this, in addition to the spatially related high-resolution images 610 and 616 generated, a predicted internal high-resolution image 612 and internal high-resolution image 614 between the high-resolution image 610 and the high-resolution image 616 are also generated. In the illustrated embodiment, not only an image with a changed resolution in space is generated, but also an image with a changed frame rate in time is generated.

Figure 7:
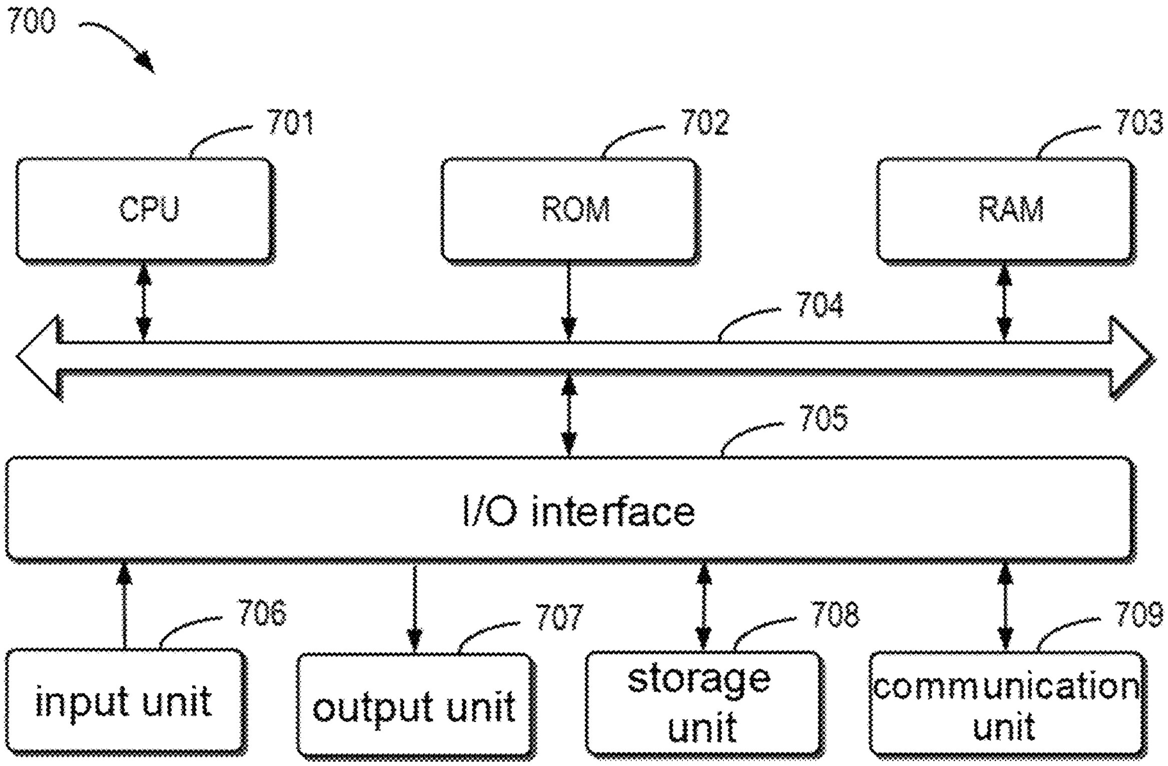
FIG. 7 shows a block diagram of an example device that can be used to implement embodiments of the present disclosure.

FIG. 7 shows a block diagram of an example device 700 that can be used to implement embodiments of the present disclosure. As shown in FIG. 7, the device 700 includes a Central Processing Unit (CPU) 701, which can perform various appropriate actions and processes according to computer program instructions stored in a Read-Only Memory (ROM) 702 or loaded into a Random Access Memory (RAM) 703 from a storage unit 708. In the RAM 703, various programs and data required for the operation of the device 700 can also be stored. The CPU 701, ROM 702, and RAM 703 are connected to each other through a bus 704. An input/output (I/O) interface 705 is also connected to the bus 704.

Multiple components in the device 700 are connected to the I/O interface 705, including: an input unit 706, such as a keyboard, a mouse, and the like; an output unit 707, such as various types of displays, speakers, and the like; the storage unit 708, such as a magnetic disk, an optical disk, and the like; and a communication unit 709, such as a network card, a modem, a wireless communication transceiver, and the like. The communication unit 709 allows the device 700 to exchange information/data with other devices through a computer network such as the Internet and/or various telecommunication networks.

Various procedures and processes described above, such as the methods 200 and 300, can be performed by the CPU 701. For example, in some embodiments, the methods 200 and 300 can be implemented as a computer software program tangibly embodied in a machine-readable medium, such as the storage unit 708. In some embodiments, part or all of the computer program can be loaded and/or installed on the device 700 via the ROM 702 and/or the communication unit 709. When the computer program is loaded into the RAM 703 and executed by the CPU 701, one or more actions of the methods 200 and 300 described above can be performed.

Illustrative embodiments of the present disclosure include a method, apparatus, system, and/or computer program product. The computer program product may include a computer-readable storage medium on which computer-readable program instructions for performing various aspects of the present disclosure are loaded.

The computer-readable storage medium may be a tangible device that can maintain and store instructions to be used by an instruction execution device. For example, the computer-readable storage medium may be, but is not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a RAM, a ROM, an Erasable Programmable Read-Only Memory (EPROM or flash memory), a static random access memory (SRAM), a portable Compact Disc Read-Only Memory (CD-ROM), a Digital Versatile Disc (DVD), a memory stick, a floppy disk, a mechanical coding device, such as a punch card or a raised structure in a groove on which instructions are stored, and any suitable combination thereof. The computer-readable storage medium used herein is not to be interpreted as a transient signal itself, such as radio waves or other freely propagating electromagnetic waves, electromagnetic waves propagating through waveguides or other transmission media (e.g., optical pulses through optical fiber cables), or electrical signals transmitted through wires.

The computer-readable program instructions described herein can be downloaded from a computer-readable storage medium to various computing/processing devices, or downloaded to an external computer or external storage device through a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, Instruction Set Architecture (ISA) instructions, machine instructions, machine-related instructions, microcode, firmware instructions, state setting data, or source code or object code written in any combination of one or more programming languages, including object-oriented programming languages such as Smalltalk and C++, and conventional procedural programming languages such as “C” language or the like. Computer-readable program instructions may be completely executed on a user computer, partially executed on a user computer, executed as a stand-alone software package, partially executed on a user computer and partially executed on a remote computer, or completely executed on a remote computer or server. In the case involving a remote computer, the remote computer may be connected to a user computer through any kind of network, including a Local Area Network (LAN) or a Wide Area Network (WAN), or may be connected to an external computer (e.g., through the Internet using an Internet service provider). In some embodiments, by personalizing and customizing an electronic circuit, such as a programmable logic circuit, a Field Programmable Gate Array (FPGA), or a Programmable Logic Array (PLA), using the state information of computer-readable program instructions, the electronic circuit can execute the computer-readable program instructions to implement various aspects of the present disclosure.

Various aspects of the present disclosure are described herein with reference to flowcharts and/or block diagrams of the method, apparatus (system), and computer program product according to embodiments of the present disclosure. It should be understood that each block of the flowcharts and/or block diagrams and combinations of blocks in the flowcharts and/or block diagrams can be implemented by computer-readable program instructions.

These computer-readable program instructions may be provided to a processing unit of a general-purpose computer, a special-purpose computer, or other programmable data processing apparatus to produce a machine, such that these instructions, when executed by the processing unit of the computer or other programmable data processing apparatus, produce means for implementing the functions/acts specified in one or more blocks in the flowcharts and/or block diagrams. These computer-readable program instructions may also be stored in a computer-readable storage medium, and cause a computer, a programmable data processing apparatus, and/or other devices to function in a particular manner, so that the computer-readable medium having the instructions stored thereon includes an article of manufacture including instructions for implementing various aspects of the functions/acts specified in one or more blocks in the flowcharts and/or block diagrams.

The computer-readable program instructions may also be loaded onto a computer, other programmable data processing apparatuses, or other devices, such that a series of operational steps are performed on the computer, other programmable data processing apparatuses, or other devices to produce a computer-implemented process, such that the instructions executed on the computer, other programmable data processing apparatuses, or other devices implement the functions/actions specified in one or more blocks in the flowcharts and/or block diagrams.

The flowcharts and block diagrams in the drawings show the architecture, functions, and operations of possible implementations of systems, methods, and computer program products according to multiple embodiments of the present disclosure. In this regard, each block in the flowcharts or block diagrams may represent a module, a program segment, or a part of an instruction, which contains one or more executable instructions for implementing specified logical functions. In some alternative implementations, the functions noted in the blocks may also occur in a different order than that noted in the drawings. For example, two successive blocks may actually be executed substantially in parallel, and they may sometimes be executed in a reverse order, depending on the functions involved. It should also be noted that each block in the block diagrams and/or flowcharts and combination of blocks in the block diagrams and/or flowcharts can be implemented by a dedicated hardware-based system that performs specified functions or actions, or can be implemented by a combination of dedicated hardware and computer instructions.

Illustrative embodiments of the present disclosure have been described above, and the above description is exemplary, not exhaustive, and is not limited to the disclosed embodiments. Numerous modifications and changes will be apparent to those of ordinary skill in the art without departing from the scope and spirit of the illustrated embodiments. The terminology used herein is chosen to best explain the principles, practical applications and associated technical improvements of the various embodiments disclosed herein, so as to enable those of ordinary skill in the art to understand the various embodiments disclosed herein.

What is claimed is:

1. A method for generating a super-resolution image model, comprising:

acquiring a first image with a first resolution and a second image with a second resolution, the first image corresponding to the second image;

generating a first super-resolution image with a first super resolution and a second super-resolution image with a second super resolution based on the first image according to an initial super-resolution image model;

transforming the first super-resolution image into a first frequency-domain representation;

transforming the second super-resolution image into a second frequency-domain representation; and generating a trained super-resolution image model based on the first frequency-domain representation, the second frequency-domain representation, and a reference frequency-domain representation;

wherein generating the trained super-resolution image model comprises training the initial super-resolution image model utilizing a loss that includes at least one error measure computed from the first frequency-domain representation, the second frequency-domain representation and the reference frequency-domain representation, the at least one error measure being determined at least in part as a function of a first difference between the first frequency-domain representation and the reference frequency-domain representation and a second difference between the second frequency-domain representation and the reference frequency-domain representation.

2. The method according to claim 1, wherein generating the trained super-resolution image model comprises:

determining a first frequency-domain difference between the first frequency-domain representation and the reference frequency-domain representation;

determining a second frequency-domain difference between the second frequency-domain representation and the reference frequency-domain representation;

determining a frequency-domain loss based on the first frequency-domain difference and the second frequency-domain difference; and training the initial super-resolution image model based on the frequency-domain loss.

3. The method according to claim 2, wherein determining the frequency-domain loss comprises:

determining a frequency-domain error based on the square of the first frequency-domain difference and the square of the second frequency-domain difference;

determining an error weight based on the first frequency-domain difference and the second frequency-domain difference; and determining the frequency-domain loss based on the frequency-domain error and the error weight.

4. The method according to claim 1, wherein generating the first super-resolution image and the second super-resolution image comprises:

determining a first scaling factor based on the first resolution and the first super resolution;

determining a second scaling factor based on the first resolution and the first super resolution; and determining a first pixel value and a second pixel value of each pixel in the first image at the first super resolution and the second super resolution respectively based on the first image, the first scaling factor, and the second scaling factor and according to the initial super-resolution image model, to obtain the first super-resolution image and the second super-resolution image.

5. The method according to claim 4, wherein determining the first pixel value and the second pixel value comprises:

acquiring a third image adjacent to the first image in a time domain;

extracting a spliced feature map of the first image and the third image by using an encoder of the initial super-resolution image model;

determining a feature vector indicated by a spatial-temporal coordinate of a pixel in the first image from the spliced feature map; and determining the first pixel value and the second pixel value based on the first scaling factor and the second scaling factor, the feature vector, and the spatial-temporal coordinate and according to a spatial-temporal super-resolution module of the initial super-resolution image model.

6. The method according to claim 5, wherein determining the first pixel value and the second pixel value comprises:

generating a first feature and a second feature for the first scaling factor and the second scaling factor based on the first scaling factor and the second scaling factor, the feature vector, and a spatial coordinate in the spatial-temporal coordinate and according to a spatial super-resolution sub-module of the spatial-temporal super-resolution module;

determining a first spatial-temporal representation corresponding to the first pixel value and a second spatial-temporal representation corresponding to the second pixel value based on the first feature, the second feature, and a temporal coordinate in the spatial-temporal coordinate and according to a temporal super-resolution sub-module of the spatial-temporal super-resolution module; and determining the first pixel value and the second pixel value based on the first spatial-temporal representation and the second spatial-temporal representation and according to a decoding sub-module of the spatial-temporal super-resolution module.

7. The method according to claim 1, wherein transforming the first super-resolution image into the first frequency-domain representation comprises:

extracting a first feature map of the first super-resolution image;

determining a feature vector of each pixel in the first super-resolution image in the first feature map to obtain a set of first feature vectors; and performing Fourier transform on the set of first feature vectors to obtain a set of sub-frequency-domain representations as the first frequency-domain representation.

8. The method according to claim 1, further comprising:

acquiring the second image as a real value image; and reducing the second resolution of the second image to obtain the first image.

9. The method according to claim 1, further comprising:

receiving an access request for a stored video with a third resolution from an electronic device;

determining a target resolution and a target frame rate corresponding to the access request; and generating a target video with the target resolution and the target frame rate based on the stored video, the target resolution, and the target frame rate and according to the trained super-resolution image model.

10. An electronic device, comprising:

at least one processor; and memory coupled to the at least one processor, the memory having instructions stored therein that, when executed by the at least one processor, cause the electronic device to perform actions comprising:

acquiring a first image with a first resolution and a second image with a second resolution, the first image corresponding to the second image;

generating a first super-resolution image with a first super resolution and a second super-resolution image with a second super resolution based on the first image according to an initial super-resolution image model;

transforming the first super-resolution image into a first frequency-domain representation;

transforming the second super-resolution image into a second frequency-domain representation; and generating a trained super-resolution image model based on the first frequency-domain representation, the second frequency-domain representation, and a reference frequency-domain representation;

wherein generating the trained super-resolution image model comprises training the initial super-resolution image model utilizing a loss that includes at least one error measure computed from the first frequency-domain representation, the second frequency-domain representation and the reference frequency-domain representation, the at least one error measure being determined at least in part as a function of a first difference between the first frequency-domain representation and the reference frequency-domain representation and a second difference between the second frequency-domain representation and the reference frequency-domain representation.

11. The electronic device according to claim 10, wherein generating the trained super-resolution image model comprises:

determining a first frequency-domain difference between the first frequency-domain representation and the reference frequency-domain representation;

determining a second frequency-domain difference between the second frequency-domain representation and the reference frequency-domain representation;

determining a frequency-domain loss based on the first frequency-domain difference and the second frequency-domain difference; and training the initial super-resolution image model based on the frequency-domain loss.

12. The electronic device according to claim 11, wherein determining the frequency-domain loss comprises:

determining a frequency-domain error based on the square of the first frequency-domain difference and the square of the second frequency-domain difference;

determining an error weight based on the first frequency-domain difference and the second frequency-domain difference; and determining the frequency-domain loss based on the frequency-domain error and the error weight.

13. The electronic device according to claim 10, wherein generating the first super-resolution image and the second super-resolution image comprises:

determining a first scaling factor based on the first resolution and the first super resolution;

determining a second scaling factor based on the first resolution and the first super resolution; and determining a first pixel value and a second pixel value of each pixel in the first image at the first super resolution and the second super resolution respectively based on the first image, the first scaling factor, and the second scaling factor and according to the initial super-resolution image model, to obtain the first super-resolution image and the second super-resolution image.

14. The electronic device according to claim 13, wherein determining the first pixel value and the second pixel value comprises:

acquiring a third image adjacent to the first image in a time domain;

extracting a spliced feature map of the first image and the third image by using an encoder of the initial super-resolution image model;

determining a feature vector indicated by a spatial-temporal coordinate of a pixel in the first image from the spliced feature map; and determining the first pixel value and the second pixel value based on the first scaling factor and the second scaling factor, the feature vector, and the spatial-temporal coordinate and according to a spatial-temporal super-resolution module of the initial super-resolution image model.

15. The electronic device according to claim 14, wherein determining the first pixel value and the second pixel value comprises:

generating a first feature and a second feature for the first scaling factor and the second scaling factor based on the first scaling factor and the second scaling factor, the feature vector, and a spatial coordinate in the spatial-temporal coordinate and according to a spatial super-resolution sub-module of the spatial-temporal super-resolution module;

determining a first spatial-temporal representation corresponding to the first pixel value and a second spatial-temporal representation corresponding to the second pixel value based on the first feature, the second feature, and a temporal coordinate in the spatial-temporal coordinate and according to a temporal super-resolution sub-module of the spatial-temporal super-resolution module; and determining the first pixel value and the second pixel value based on the first spatial-temporal representation and the second spatial-temporal representation and according to a decoding sub-module of the spatial-temporal super-resolution module.

16. The electronic device according to claim 10, wherein transforming the first super-resolution image into the first frequency-domain representation comprises:

extracting a first feature map of the first super-resolution image;

determining a feature vector of each pixel in the first super-resolution image in the first feature map to obtain a set of first feature vectors; and performing Fourier transform on the set of first feature vectors to obtain a set of sub-frequency-domain representations as the first frequency-domain representation.

17. The electronic device according to claim 10, wherein the actions further comprise:

acquiring the second image as a real value image; and reducing the second resolution of the second image to obtain the first image.

18. The electronic device according to claim 10, wherein the actions further comprise:

receiving an access request for a stored video with a third resolution from an electronic device;

determining a target resolution and a target frame rate corresponding to the access request; and generating a target video with the target resolution and the target frame rate based on the stored video, the target resolution and the target frame rate and according to the trained super-resolution image model.

19. A computer program product comprising a non-transitory computer-readable medium having machine-executable instructions stored therein, wherein the machine-executable instructions, when executed by a machine, cause the machine to perform actions comprising:

acquiring a first image with a first resolution and a second image with a second resolution;

generating a first super-resolution image with a first super resolution and a second super-resolution image with a second super resolution based on the first image according to an initial super-resolution image model;

transforming the first super-resolution image into a first frequency-domain representation;

transforming the second super-resolution image into a second frequency-domain representation; and training the initial super-resolution image model based on the first frequency-domain representation, the second frequency-domain representation, and a reference frequency-domain representation to generate a trained super-resolution image model;

wherein training the initial super-resolution image model to generate the trained super-resolution image model comprises utilizing a loss that includes at least one error measure computed from the first frequency-domain representation, the second frequency-domain representation and the reference frequency-domain representation, the at least one error measure being determined at least in part as a function of a first difference between the first frequency-domain representation and the reference frequency-domain representation and a second difference between the second frequency-domain representation and the reference frequency-domain representation.

20. The computer program product according to claim 19, wherein training the initial super-resolution image model comprises:

determining a first frequency-domain difference between the first frequency-domain representation and the reference frequency-domain representation;

determining a second frequency-domain difference between the second frequency-domain representation and the reference frequency-domain representation;

determining a frequency-domain loss based on the first frequency-domain difference and the second frequency-domain difference; and training the initial super-resolution image model based on the frequency-domain loss.

* * * * *